(12) United States Patent
Nemovicher

(10) Patent No.: US 11,711,378 B1
(45) Date of Patent: Jul. 25, 2023

(54) CYBERSECURITY INFECTION DETECTION SYSTEM AND METHOD

(71) Applicant: CRYTICA SECURITY INC., Reno, NV (US)

(72) Inventor: C. Kerry Nemovicher, Reno, NV (US)

(*) Notice: Subject to any disclaimer, the term of this patent is extended or adjusted under 35 U.S.C. 154(b) by 227 days.

(21) Appl. No.: 17/327,747

(22) Filed: May 23, 2021

Related U.S. Application Data

(63) Continuation-in-part of application No. 15/930,699, filed on May 13, 2020, now abandoned.

(60) Provisional application No. 62/847,839, filed on May 14, 2019.

(51) Int. Cl.
| | |
|---|---|
| *H04L 29/06* | (2006.01) |
| *H04L 9/40* | (2022.01) |
| *H04L 9/00* | (2022.01) |

(52) U.S. Cl.
CPC .......... *H04L 63/1408* (2013.01); *H04L 9/006* (2013.01); *H04L 63/0421* (2013.01)

(58) Field of Classification Search
CPC ............ H04L 63/1425; H04L 63/1433; H04L 63/1416; H04L 43/12; G06F 21/552; G06F 21/562
See application file for complete search history.

(56) References Cited

U.S. PATENT DOCUMENTS

| | | | |
|---|---|---|---|
| 10,346,612 B1* | 7/2019 | Donovan | G06F 21/577 |
| 2014/0025627 A1* | 1/2014 | Bhattacharya | H04L 41/0843 |
| | | | 707/E17.005 |
| 2014/0137272 A1* | 5/2014 | Baset | G06F 21/566 |
| | | | 726/32 |
| 2014/0215621 A1* | 7/2014 | Xaypanya | H04L 63/145 |
| | | | 726/23 |
| 2014/0344933 A1* | 11/2014 | Huh | H04L 63/1416 |
| | | | 726/23 |
| 2014/0366132 A1* | 12/2014 | Stiansen | H04L 63/1491 |
| | | | 726/22 |
| 2016/0044054 A1* | 2/2016 | Stiansen | H04L 63/1416 |
| | | | 726/24 |
| 2017/0244738 A1* | 8/2017 | Clark | H04L 67/10 |
| 2019/0141075 A1* | 5/2019 | Gay | H04L 63/1416 |
| 2019/0238567 A1* | 8/2019 | Sharma | H04L 9/3242 |

* cited by examiner

*Primary Examiner* — Ellen Tran

(57) ABSTRACT

A cybersecurity infection detection system and method of use. In some embodiments, the system and process provide improved network security, computer security, or both, through mutually assured, defense in depth approaches. In some embodiments, one or more of defense in depth, collaborative attack detection, remediation, component redundancy, component self-monitoring, and component self-replacing are combined to effect an enhanced cybersecurity system. In some embodiments, the cybersecurity system and method include, but are not limited to, one or more of one or more probes, monitors, configuration ledgers, signature ledgers, audit ledgers, configuration controllers, message engines, switchboards, and a public-private key infrastructure.

1 Claim, 12 Drawing Sheets

CYBERSECURITY INFECTION DETECTION SYSTEM AND METHOD

CROSS-REFERENCE TO RELATED APPLICATIONS

This application is a continuation-in-part of U.S. Non-Provisional patent application Ser. No. 15/930,699 entitled "CYBERSECURITY INFECTION DETECTION SYSTEM AND METHOD" filed on May 13, 2020, which claims priority through the applicant's prior U.S. Provisional Patent Application No. 62/847,839 entitled "MUTUALLY ASSURED DEFENSE IN DEPTH CYBERSECURITY SYSTEM AND METHOD" filed on May 14, 2019, which application is hereby incorporated by reference in its entirety.

COPYRIGHT NOTICE

This patent document contains material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF DISCLOSURE

The present application relates to the technical field of cybersecurity, and more particularly, to a system and method that improves network security, computer security, or both, through mutually assured, defense in depth approaches.

APPLICANTS' VIEW OF SOME ASPECTS OF PRIOR ART

Traditionally, cybersecurity systems were designed to perform a small number of tasks with little or no concern for the cyber criminals' potential countermeasures. For example, there has been little attempt to protect the virus scanner itself that runs in the background on a personal computer. Developers of virus scanner software have typically assumed that their software is so puissant that it would catch any new malware attacking the system. A problem with this assumption is that virus scanners have historically only had the capability to identify and catch previously identified malware. They typically could not identify previously unidentified attacks (a.k.a. "zero-day attacks"). There has been little to protect against an intelligently designed attack that first disables, or, worse, co-opts, the virus scanner software.

In addition, these systems have historically lacked a mutually monitoring, multiple layered defense approach that could potentially counter such a compromise. Such an approach could have integrated multi-faceted collaborative attack detection systems with powerful remediation systems. Standalone systems and non-interdependent, non-redundant, non-mutually protecting elements of traditional systems have not been effective as they could have been.

The expression "defense in depth" has typically been misapplied by some cybersecurity endeavors to connote a configuration wherein multiple cybersecurity tools work in parallel. That is not true defense in depth. These endeavors promulgated what was often termed as the "Castle Defense Principle," wherein different parts of the castle protected against different types of attacks. But this is an example of a mere conglomeration of defensive weapons, not a mutually supportive effort. It was not true defense in depth. Without redundant, mutually protecting components, these traditional strategies were typically a sub-optimal grouping of independent systems.

At present, there is no known way to provide an impenetrable wall around cyber systems. Some attacks will penetrate. Cybersecurity defense, therefore, will typically fall short if it cannot detect these penetrating attacks as quickly as possible, contain them, and then remediate them. Key characteristics historically lacking include one or more of rapidity, timely detection, and a forceful, effective response.

For at least these reasons, the applicants believe that they have discovered a need for a more structured, efficient, automated, flexible, and reliable cybersecurity infection detection system and method.

BRIEF SUMMARY OF SOME ASPECTS OF THIS SPECIFICATION

The applicants believe that they have discovered at least some of the issues and problems, or their scope, identified in the Aspects of Prior Art section above. The applicants have therefore developed, among other things, computer-implemented, automated systems, processes, and devices that solve one or more of the above-mentioned problems with cybersecurity systems.

Collaborative attack detection, remediation, or both, can be an important element of an effective cybersecurity system. Since it has been shown many times that even the best standalone cybersecurity programs can be compromised, cybersecurity programs that work in concert in order to monitor each other could improve security. In some instances, mutual attack detection can help to reduce the likelihood of a successful attack that disables all active defense components simultaneously.

In some embodiments, multiple self-monitoring components can serve as an additional measure of defense to a mutually assured defense in depth configuration. Self-monitoring can speed up the detection process for certain types of attacks.

Having redundant components can increase the speed in which attacks can be detected, and a compromised system can be remediated and brought back to full functionality. Having redundant components enables those components to readily monitor each other and rapidly detect an infected component.

In some implementations, as part of a communication protocol, there are scheduled messages whose function is to detect and reduce the likelihood that the communication channel has not been disrupted. Each message may be one or more of unique, encrypted, and digitally signed. Any disruption to the regularity and content of a message may, for example. trigger an alarm.

There are many other novel features, problem solutions, and advantages of the present specification. They will become apparent as this specification proceeds. In this regard, it is to be understood that the scope of the invention is to be determined by the claims as issued and not by whether the subject matter provides features because they are set forth in the Aspects sections of this specification.

BRIEF DESCRIPTION OF THE DRAWINGS

The applicants' preferred and other embodiments are disclosed in association with the accompanying Figures. In the Figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SOME EMBODIMENTS

Figure 1:
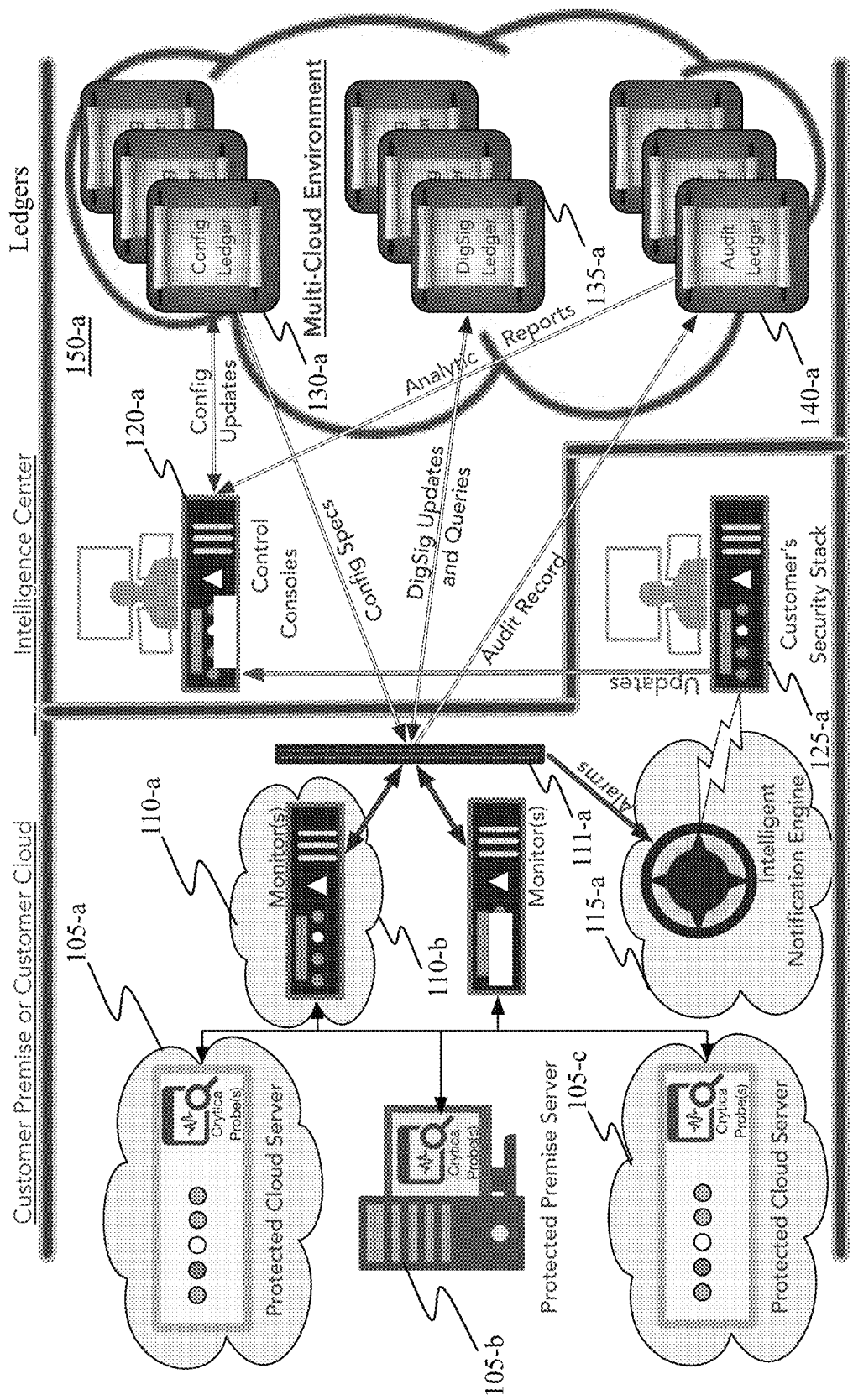
FIG. 1 is a computer network or similar digital processing environment in which a cybersecurity infection detection system can be implemented according to an exemplary embodiment.

This disclosure is directed to the technical field of cybersecurity systems and methods. The prior Brief Summary and the following description provide examples and are not limiting of the scope, applicability. Changes can be made in the function and arrangement of elements discussed without departing from the spirit and scope of the disclosure. Various embodiments can omit, substitute, add, or mix and match various procedures or components as appropriate. For instance, the methods disclosed can be performed in an order different from that described, and various steps can be added, omitted, or combined. Also, features disclosed with respect to certain embodiments can be combined in or with other embodiments as well as features of other embodiments.

Certain embodiments of the cybersecurity infection detection system and method of use are described with reference to methods, apparatus (systems), and computer program products that can be implemented by computer program instructions. These computer program instructions can be provided to a processor of a computing devices, such as a general purpose computer, special purpose computer, mobile computing device, or other programmable data processing apparatus to produce a particular machine, such that the instructions, which execute via the processor of the computing device, implement the acts specified herein to transform data from a first state to a second state, transmit data from one computing device to another computing device, and generate physical state transitions at one or more geographic locations.

These computer program instructions can be stored in a computer-readable memory that can direct a computing device or other programmable data processing apparatus to operate in a particular manner, such that the instructions stored in the computer-readable memory produce an article of manufacture including instructions for implementing the acts specified herein. The computer program instructions can also be loaded onto a computing device or other programmable data processing apparatus to cause a series of operational steps to be performed on the computing device or other programmable apparatus to produce a computer-implemented process such that the instructions which execute on the computer or other programmable apparatus provide steps for implementing the acts specified herein.

The programming of the programmable apparatus creates a new machine, creating a special purpose computer once it is programmed that performs particular functions pursuant to instructions from program instructions. The cybersecurity infection detection system can be described in terms of a dedicated circuit or a process that emulates that circuit. The software processes of the cybersecurity infection detection system are, at least in part, interchangeable with a hardware circuit. This new machine can thus be implemented as a complex array of hardware circuits, programming that facilitates the unique functions of the cybersecurity infection detection system, or both.

The various illustrative logical blocks, modules, and algorithm steps described in connection with the embodiments disclosed herein can be implemented as electronic hardware, computer software, or combinations of both. To illustrate this interchangeability of hardware and software, various illustrative components, blocks, modules, and steps have been described generally in terms of their functionality. Whether such functionality is implemented as hardware or software depends upon the particular application and design constraints imposed on the overall system. The described functionality can be implemented in varying ways for each particular application and function, but such implementation decisions should not be interpreted as causing a departure from the scope of the disclosure.

The various illustrative logical blocks and modules described in connection with the embodiments disclosed herein can be implemented or performed with a general purpose processor, a specific purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices such as, for example, a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a computer terminal. In the alternative, the processor and the storage medium can reside as discrete components in a computer terminal.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently such as, for example, through multi-threaded processing, interrupt processing, or multiple processors or processor cores, rather than sequentially. Moreover, in certain embodiments, acts or events can be performed on alternate tiers or on alternate components within the architecture.

Figure 2:
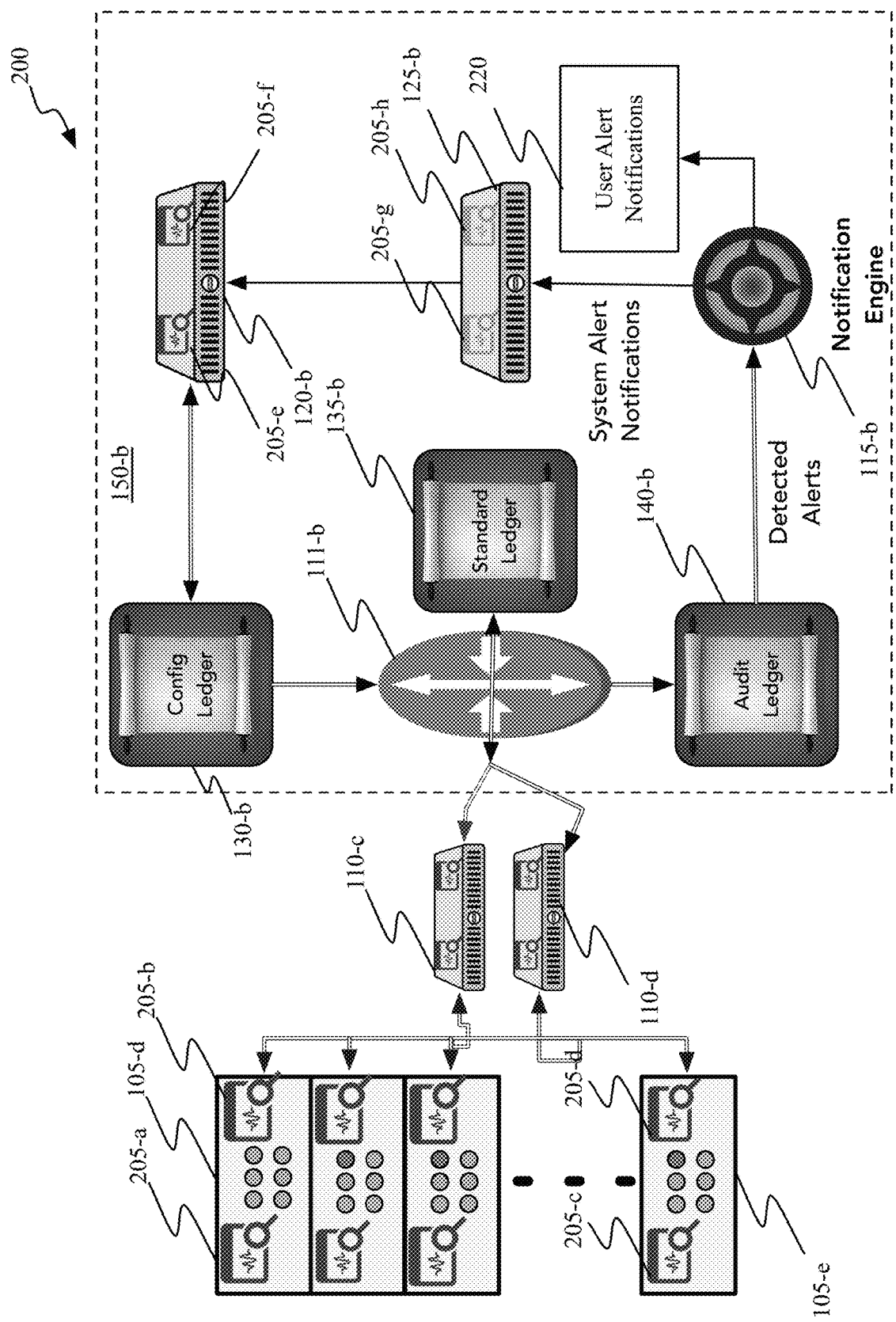
FIG. 2 is another computer network or similar digital processing environment in which a cybersecurity infection detection system can be implemented according to an exemplary embodiment.

Referring now to FIG. 1 and FIG. 2, a computer network or similar digital processing environment in which the system and method disclosed can be implemented. The cybersecurity infection detection system and method of use can be distributed on multiple computers and devices 150. In some instances, the cybersecurity infection detection system is in communication with a security stack 125. In some embodiments, the cybersecurity system and method includes, but is not limited to, one or more of the following components providing one or more of infection monitoring or detection or protected devices 105, such as a cloud server, on-premise server, peripheral device, internet-of-things device, network device, smart device, or other computing device:
  a) Probe, which can also be referred to as an agent 205;
  b) Monitor 110;
  c) Configuration ledger 130;
  d) Signature ledger, which can also be referred to as a standard ledger 135;
  e) Audit ledger 140;
  f) Configuration controller 120;
  g) Notification engine 115;
  h) Public-private key infrastructure (not shown, but can be operably integrated with the configuration controller 120; and
  i) Switchboard 111.

In some embodiments, the configuration controller consoles specify the monitors' configurations, are where the configurations are modified, or both. Configurations can be written, digitally signed, to the configuration ledgers, as well as recorded, digitally signed, in the audit ledgers.

In some implementations, a messaging engine controls how the various components communicate with each other. In some instances, messages consist of two primary parts: to whom the message is intended and from whom it came, and the contents of the message. One or both parts can be digitally signed by the sender, encrypted with the public of key(s) of their intended recipients(s), or both.

In some embodiments, the cybersecurity system makes use of Public-Private Key Infrastructure, which can involve a database of one or more of the components, paired with their respective public keys. Some or all of the components of the Public-Private Key Infrastructure system are protected by the system. One or more devices are protected by one or more monitors and one or more probes. Public-Private Key Infrastructure servers can function in a similar manner as ledger servers do.

In some instances, the switchboard prevents "traffic monitoring" of the infrastructure. It does so by, at least in part, anonymizing the "to" and "from" of each message. When a Switchboard is in use, messages can be sent through it. When a message is issued from one component, e.g., from a monitor, to another, e.g., a ledger, the "To" part of message ("the header") can be initially encrypted with the switchboard's public key and sent to the switchboard. Upon receipt and decryption of the message header, the switchboard can reroute the message to the appropriate recipient, re-encrypting the header with the public key(s) of the ultimate recipient(s).

Figure 3:
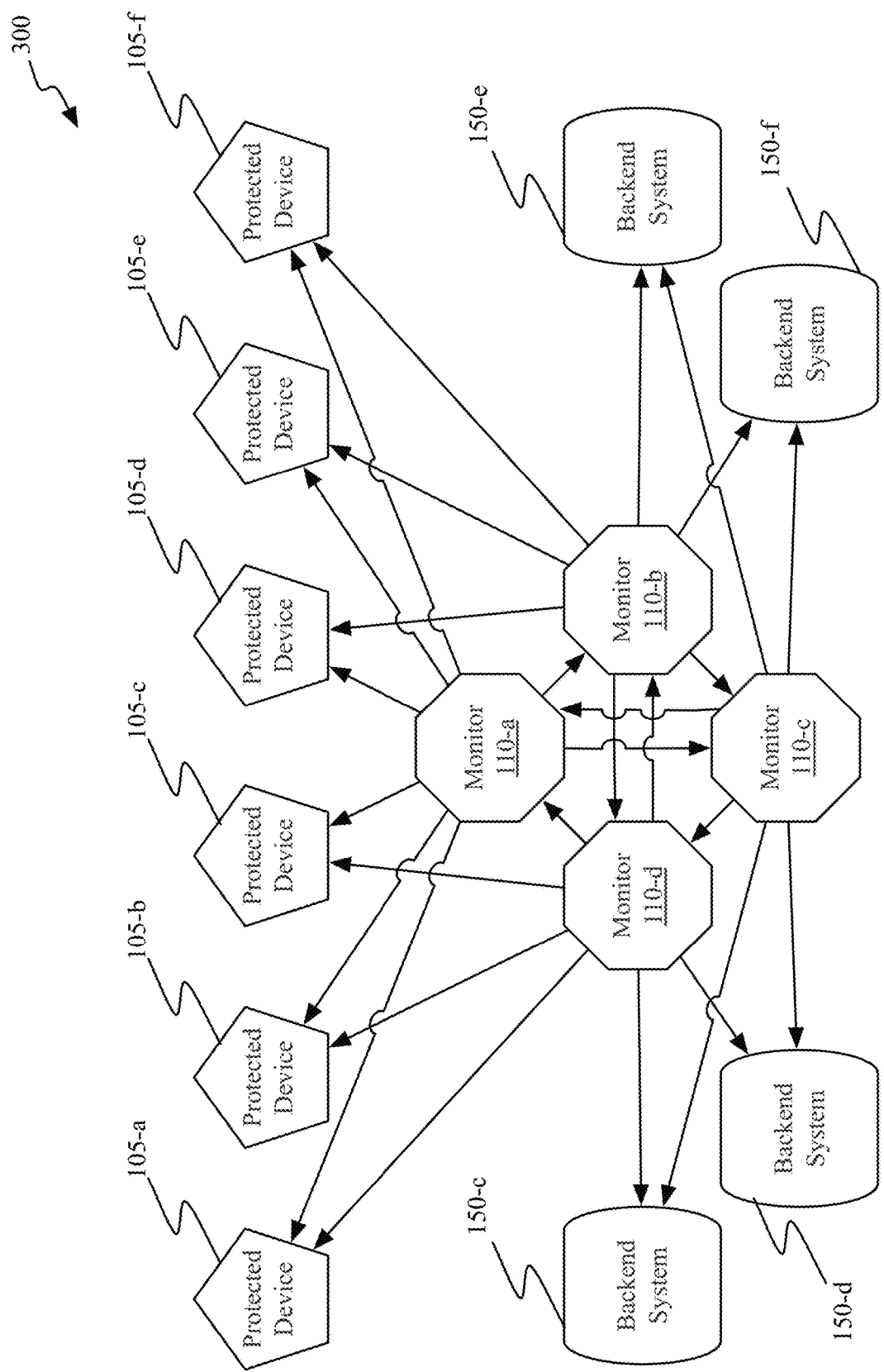
FIG. 3 is a block diagram of a self-protecting mesh of some of the components of the cybersecurity infection detection system.

Referring now to FIG. 3, in some embodiments, the redundant components are comparable to a self-protecting mesh framework, where one or more protected devices 105 are monitored and managed through interactions with multiple probe 205 functionality managed, at least in part, by the one or more monitors 110, the monitors 110 being managed by backend system services 150. The protected devices 105, as well as the devices hosting one or more of the various components of the cybersecurity infection detection system, except for the probe 205 and the messages, can have one or more probes 205 within them monitoring the protected device and the cybersecurity infection detection system components. In some implementations, probe monitoring includes performing device scanning operations.

In some embodiments, one or more probes are launched by the monitor to whom that probe reports. In some instances, one or more devices are protected by one or more probes. A single device may have probes that are launched/initiated from different monitors. Probes within the same device can take hashes of each other, as well as of the other system elements. Upon start-up, each probe can do one or more of:
  a) self-checks its own digital signature—The digitally signed hash of each probe is included in, for example, the probe code itself;
  b) performs an initial handshake with the monitor that launched it; and
  c) receives its first instructions from its Monitor.

If a probe fails to initiate properly, is discovered to be "defective", or both (e.g., it fails a hash comparison test), that probe can either self-destruct or be destroyed by its parent monitor.

Figure 4:
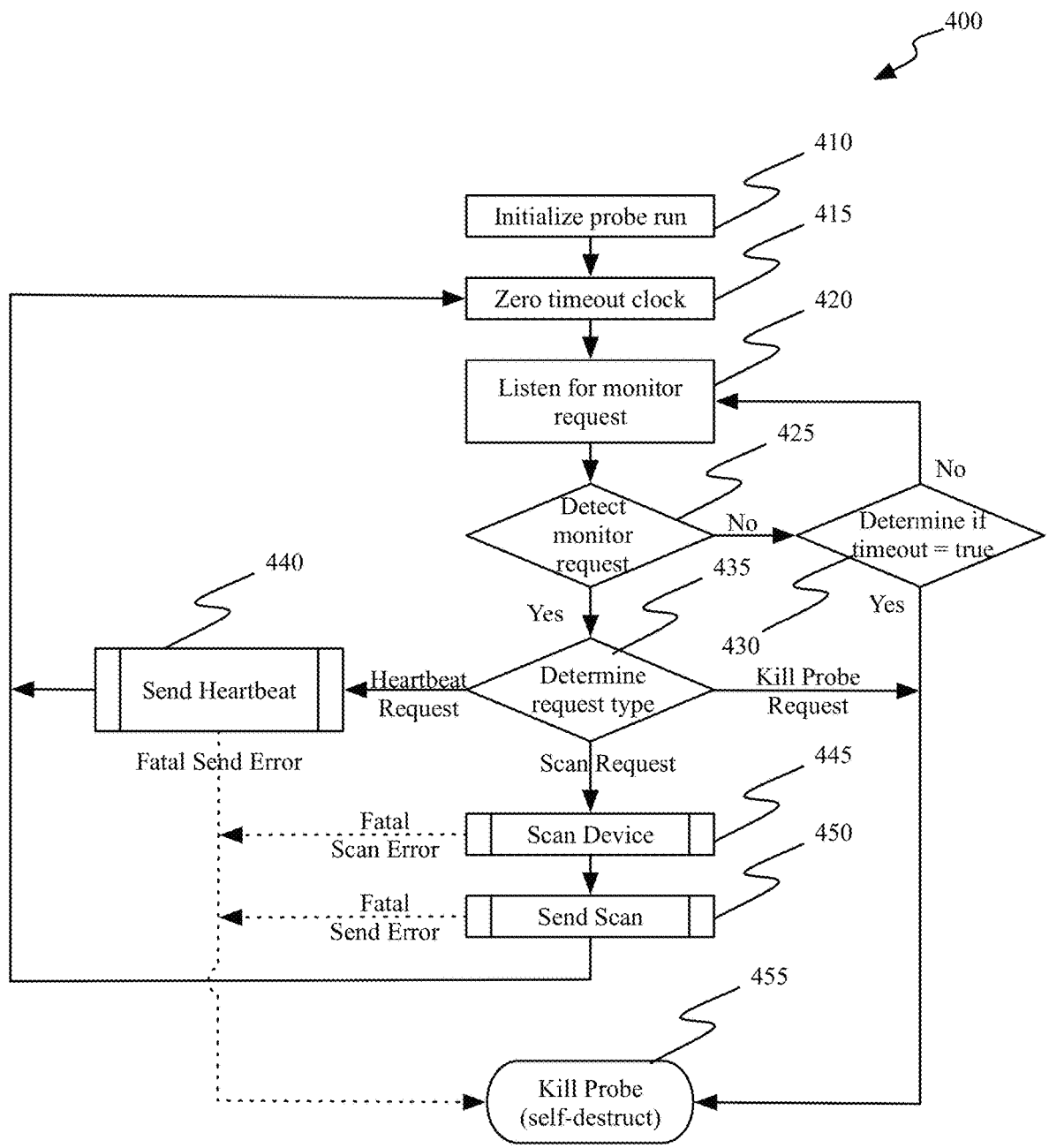
FIG. 4 is a block diagram of various operations and activities performed by one or more probes of the cybersecurity infection detection system.

Referring now to FIG. 4, in some embodiments, a probe 205 is assigned to a parent monitor 110. In some instances, a probe 205 is an executable component that is delivered to a protected device 105 by a parent monitor 110. The parent monitor 110 can further provide initialize instructions, such as, for example, a parameter file, to the probe 205. The parent monitor 110 can connect to the protected device 105 and direct the protected device 105 to execute the probe 205, where the probe 205 is initialized based upon the provided parameter file 410.

In some implementations, the probe 205 will perform a check to determine if there are any other protected device resident probes 205 sharing the same parent monitor 110 running. If it is determined that such a condition exists, the probe 205 will kill the additional probe or probes 205. In some instances, protected devices 105 host multiple probes 205, each probe 205 having a unique parent monitor 110 with respect to the other probes 205 resident on the protected device 105.

In some embodiments, the probe 205 and the parent monitor 110 are expected to communicate successfully within a pre-defined time period. This pre-defined time period can serve as a timeout, where a failure to both send and receive a communication between the two components can result in a timeout condition. Then timeout can be a fixed pre-determined value or a variable value. In some instances, the value is provided to the probe 205 by the parent monitor 110. The timeout value can be modified over time, such as in response to states or conditions detected by the probe 205, as an updated timeout value received from the parent monitor 110, or both. In some implementations, a timeout clock is zeroed out at initialization 415, after each successful communication exchange. The probe 205 can be implemented such that it listens for parent monitor requests 420 so long as a timeout determination returns false 430. Upon detection of the receipt of a monitor request 425, the probe 205 can determine the type of request 435 and proceed with the appropriate operations. In some cases, the message request type will be a kill probe request type, in which case, the probe 205 will execute a self-destruction operation 455, rendering the probe 205 inoperable, deleting the probe 205 from the protected device 105, or both. In some instances, helper processes external to the probe 205 are engaged as part of the self-destruction operations, where such helper processes can include operating system processes, installed helper applications, or both.

In other cases, the message request type will include a scan request, such as a scan of one or more files resident on the protected device 105. Where the scan results in an effective scan determination result 445, and where that scan determination result is effectively transmitted to the parent monitor 450, then the probe 205 can continue listening for requests and performing probe operations. Alternatively, where the scan is unable to generate a scan determination result, or where the attempt to transmit a scan determination results to the parent monitor 110 fails, then the probe 205 can execute a self-destruction operation 455.

In other cases, the message request type will include a heartbeat. The heartbeat can be accomplished through successful message exchange of various types. For example, where the parent monitor 110 is not requesting probe monitoring or protection activities, but instead is verifying one or more of the presence and operation of the probe 205, the probes 205 ability to communicate effectively and correctly, or the integrity of the communication channel, then a heartbeat request can be sent to the probe 205. The probe 205 can then respond accordingly with a heartbeat response within an acceptable time window 440.

In the case where no request has been received within the timeout period such that the timeout determination equals true 430, the probe 205 can include resident instructions that initiate self-destruct operations.

In some embodiments, the content portion of all communications to a probe are encrypted with the probe's Public Key, and only the probe is able to decrypt them. In some embodiments, the probe Private Key is not stored on a disk. It is generated as needed by the probe, using in part, its own hash as a seed for key generation. Thus, in some cases of probe compromise, the probe will not be able to generate its appropriate Private Key. In that situation, communications with the probe will fail their signature tests and the probe will be destroyed.

In some embodiments, each monitor is responsible for protecting one or more devices. A monitor can be, for example, a standalone device, such as a dedicated server, or a software process running resident within another security device (e.g., a firewall).

In order to protect another device, a monitor can launch one or more probes to run within that other device. It then sends instructions to one or more of its probes on that device. These tell the probe to, for example, take hashes at specified times/intervals of the system elements of the device. The identity of those elements and the frequency of the hashes are determined, at least in part by the monitor's configuration.

In some embodiments, monitors have one or more probes running within them. These probes can be initiated by, report to, or both, other monitors.

In some embodiments, when a Monitor boots up, it has no operational configuration. Its boot sequence includes one or more of:
 a) a self-check of its own digital signature—The digitally signed hash of each monitor is included in the monitor code itself;
 b) the initial handshake with the configuration ledgers;
 c) a request for, and receipt of, its operating instructions from the configuration ledgers;
 d) a check whether its GPS coordinates are within its operational range;
 e) a check of the digital signature of its host device in order to determine whether it is running inside its configured host device;
 f) the initial handshake with appropriate signature ledgers, audit ledgers, or both;
 g) the initial handshake with the appropriate external devices; and
 h) a check whether that at least one verified probe is running on its host device.

If a monitor fails to one or more of initiate properly is discovered to be "defective" (e.g., it fails a hash comparison test), or cannot find a resident probe, that monitor can, report its condition to the audit ledger and can then shut down itself, be shut down, or both.

In some instances, after it has obtained its operating instructions, a monitor commences operations, launching one or more probes in the devices it is configured to protect.

In some embodiments, the content portion of all communications to a monitor are encrypted with the monitor's Public Key. Only the monitor will be able to decrypt them. The monitor's Private Key may not be stored on a disk. It is generated as needed by the monitor, using in part, its own hash as a seed for key generation. Thus, in some cases of monitor compromise, the monitor will not be able to generate its appropriate Private Key. In that situation, communications with the monitor will fail their signature tests and, as soon as the failure is logged in the audit ledgers, the monitor can be shut down.

Figure 5:
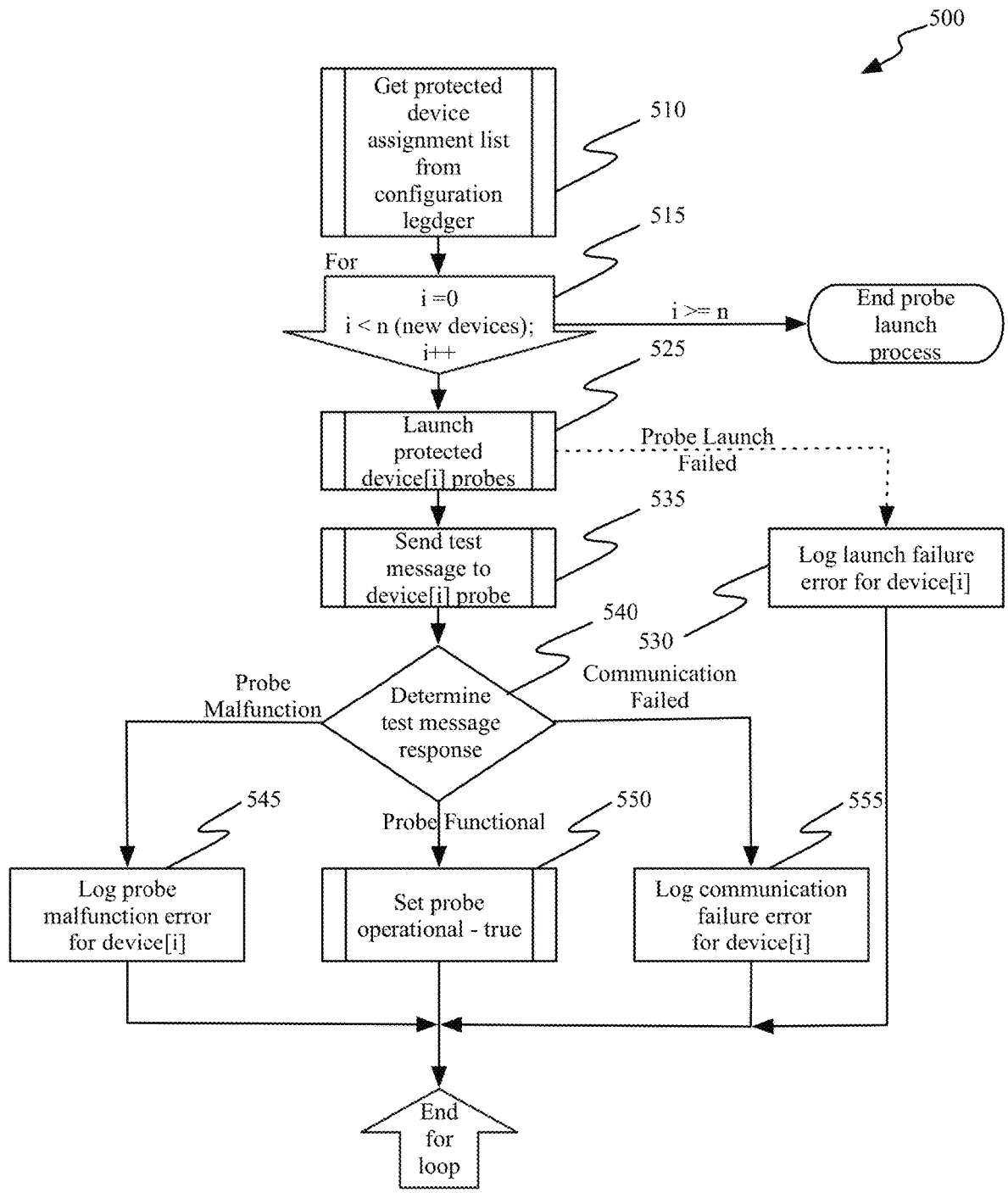
FIG. 5 is a block diagram of various launch operations and activities performed by one or more monitor components of the cybersecurity infection detection system.

Referring now to FIG. 5, in some embodiments, the monitor 110 will pull a list of protected devices 105 from the configuration ledger 130, the list indicating to which protected devices 105 it will operate as a parent monitor 510. The monitor 110 will create or update a protected device table for use in iterating through protected device probe requests and activities 515. The monitor can then launch probes 205 on protected devices 525, such as by transmitting executable probes 205, parameter files, or both to the protected devices 105. In the event the monitor 110 determines there is an indication of a launch failure, a launch failure error for the device is logged in the audit ledger 530.

In some embodiments, where there is no launch failure indication, the parent monitor 110 sends one or more test messages to the probe 205 to validate that the probe is operational, the communication channel is intact and operational, or both 535. Where a test message response is received, message type is determined and handled appropriately 540. If the test message is responded to with a probe malfunction error, the malfunction error is logged in the audit ledger 545. If the test message is responded to with a communication failure error, the communication failure error is logged in the audit ledger 555. If the test message is responded to with a probe operational confirmation, the probe operational indicator is set to true 550. In some instances, the protected device table is updated to indicate which protected devices assigned to the monitor have operational probes 205.

Figure 6:
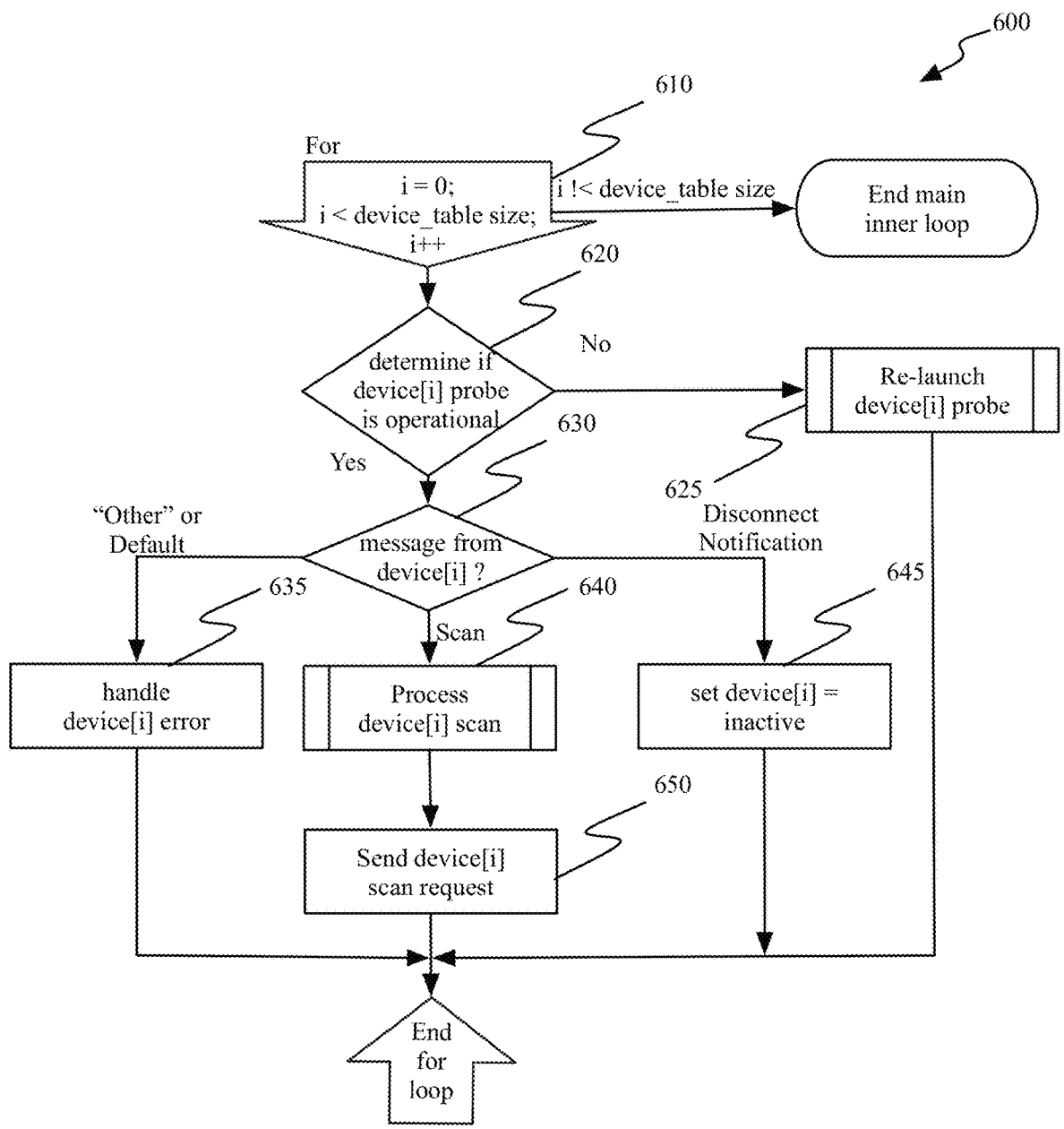
FIG. 6 is a block diagram of various monitor-involved device scan operations and activities performed by various components of the cybersecurity infection detection system.

Referring now to FIG. 6, in some embodiments, the monitor traverses the protected device table 610, 615 and determines which protected devices 105 have operational probes 620. If the probe 205 is not operational, the monitor 110 can attempt to relaunch the probe 625. If the probe 205 is determined to be operational, then the monitor 110 determines the type of the most recent received message from the probe 205. If the message received is a scan result, then the monitor 110 process the scan result 640, and in some instances, transmits a new scan request 650 to the probe 205. In some cases, where an error message is received by the monitor 110 from the probe 205, the error is handled according to a pre-defined error handling procedure 635. Where the message received is indicative of an inactive state, such as receipt of a disconnect notification, the protected device table can be updated to indicate a non-operational probe state 645.

In some implementations, the probe 205 supports or performs one or more of measurements ("hashes") of critical system components, digitally signing of those hashes, and communication of those signed hashes, such as to its parent monitor 110.

In some instances, the monitor 110 launches and operates one or more probes 205 in one or more protected devices 105 for which it is responsible. It requests from those probes 205, measurements, such as digitally signed hashes, of system components, such as critical system components, and compares those digitally signed hashes with "gold standard" signed hashes in the signature ledger 135. Hashes can include, but are not limited to, file content hashes, file permission hashes, and file ownership hashes.

In the event of an unauthorized discrepancy, the monitor 110 can issue an alert, such as an infection or device compromised alert. For every transaction the monitor 110 sends and receives, it can log, for example, a digitally signed record of that transaction in the audit ledger 140. In some embodiments, the monitor110 can also assist in creating the "gold standard" such as a standard based, at least in part, on signed hashes that are stored in the standard ledger 135.

For each monitor 110, its digitally signed configuration can be stored in the configuration ledger 130. For each monitored component, its "gold standard", which can include a digitally signed hash, can be stored in the signature ledger 135. For every transaction involving any component, that transaction can be stored, digitally signed, in the audit ledgers 140. These can include a record of every probe 205 a monitor 10 launches, the configuration of each monitor 110, changes to a monitor's 110 configuration, and every probe request and response.

Figure 7:
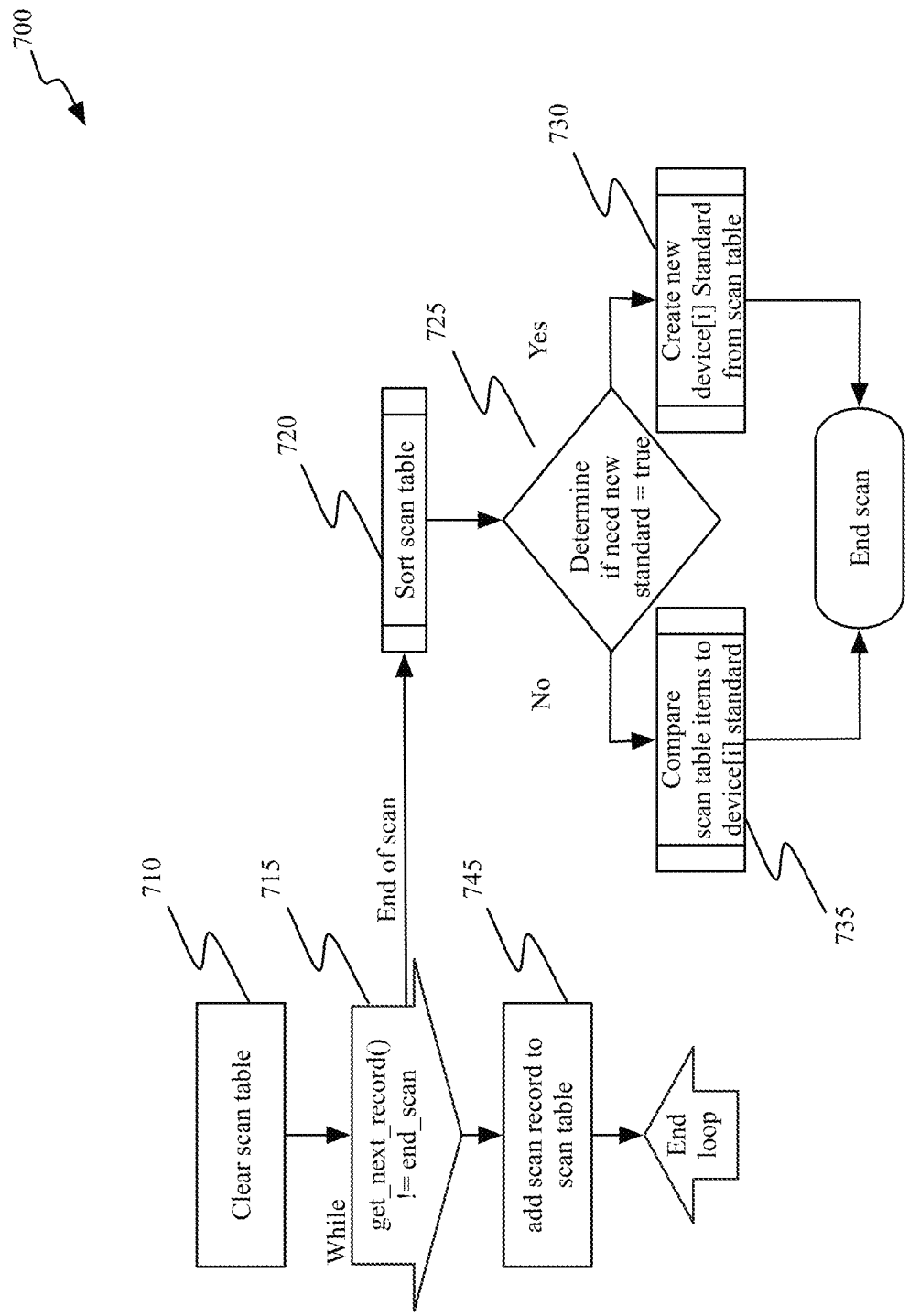
FIG. 7 is a block diagram of various monitor-involved device probe scan operations and activities performed by various components of the cybersecurity infection detection system.

Referring now to FIG. 7, a scan table is created or retrieved by the monitor 110. The scan table is cleared at least with respect to entries corresponding to the probe providing scan results 710. The monitor 110 traverses and process each of the records in the scan results received from the probe 715. For each record in the scan results, the record is added to the scan table 745. When all records from the probe scan results are added to the scan table, the scan table can be optionally sorted 720. In some instances, the monitor 110 determines or detects that a new device standard is to be set 725. When that determination is made, the monitor can use the received probe scan results and set the protected device standard equal to one or more of the probe scan result records 730. Alternatively, where a new standard is not set, the monitor can compare the probe scan results to the stored protected device standard as part of determining whether or not the protected device may be in a compromised state 735.

Figure 8:
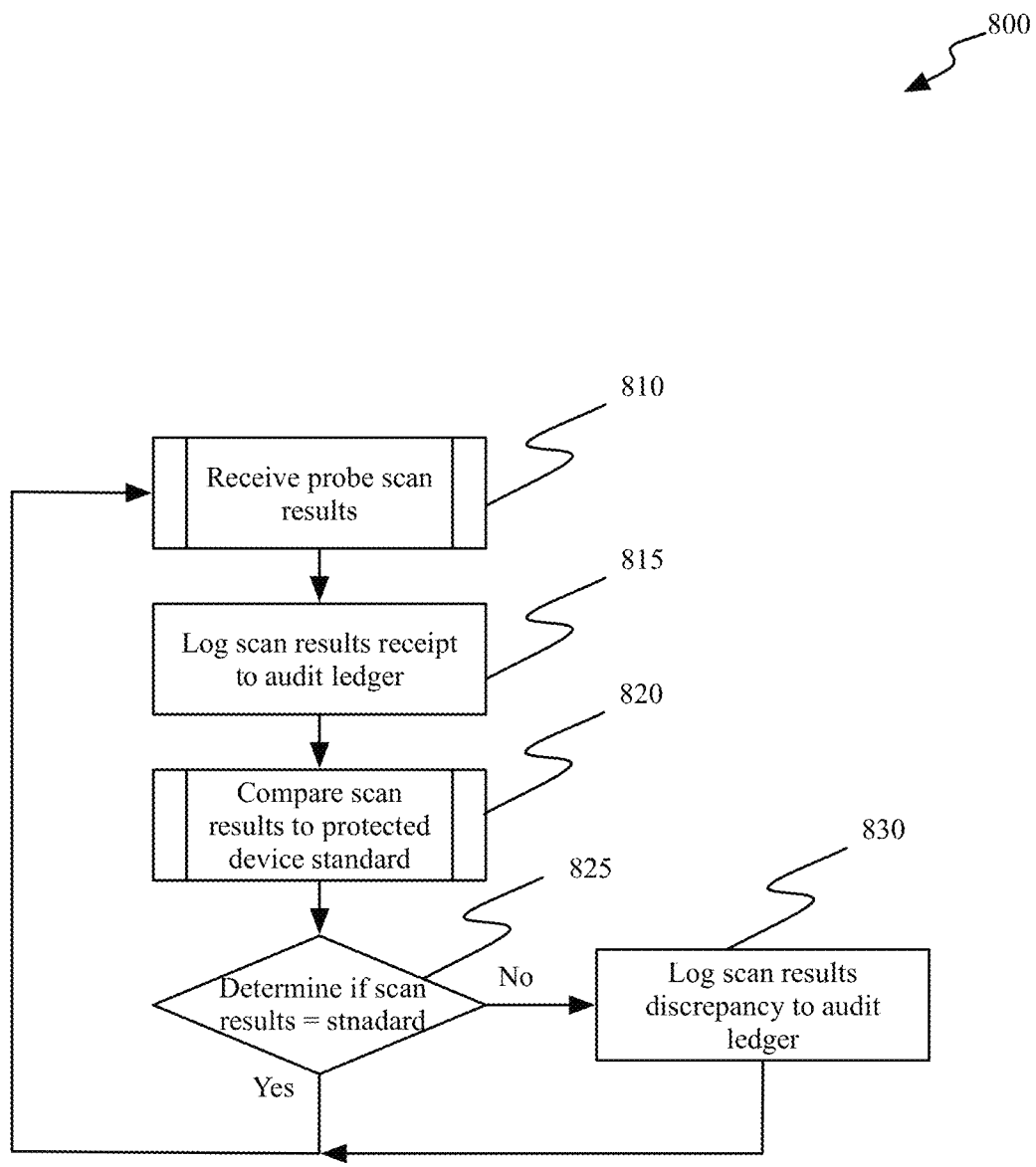
FIG. 8 is a block diagram of a scan comparison operation performed by various components of the cybersecurity infection detection system.

Referring now to FIG. 8, in some implementations, when a scan comparison operation is appropriate, the monitor 110 receives scan results 810 and logs a scan result receipt record in the audit ledger 815. The monitor can then proceed to compare one or more scan result records with the protected device standard to determine whether or not the two are identical 820, 825. In some instances, the comparison includes a tolerance for a certain degree of mismatch for one or more types of scan result records. In other instances, a match requires an identical match for all scan result records. Where the comparison determines the scan result matches the standard 825, then no alerts are issued and additional subsequent scan requests may be issued. Alternatively, where the comparison determines the scan result does not match the standard 825, a scan result discrepancy event is logged to the audit ledger 830.

Figure 9:
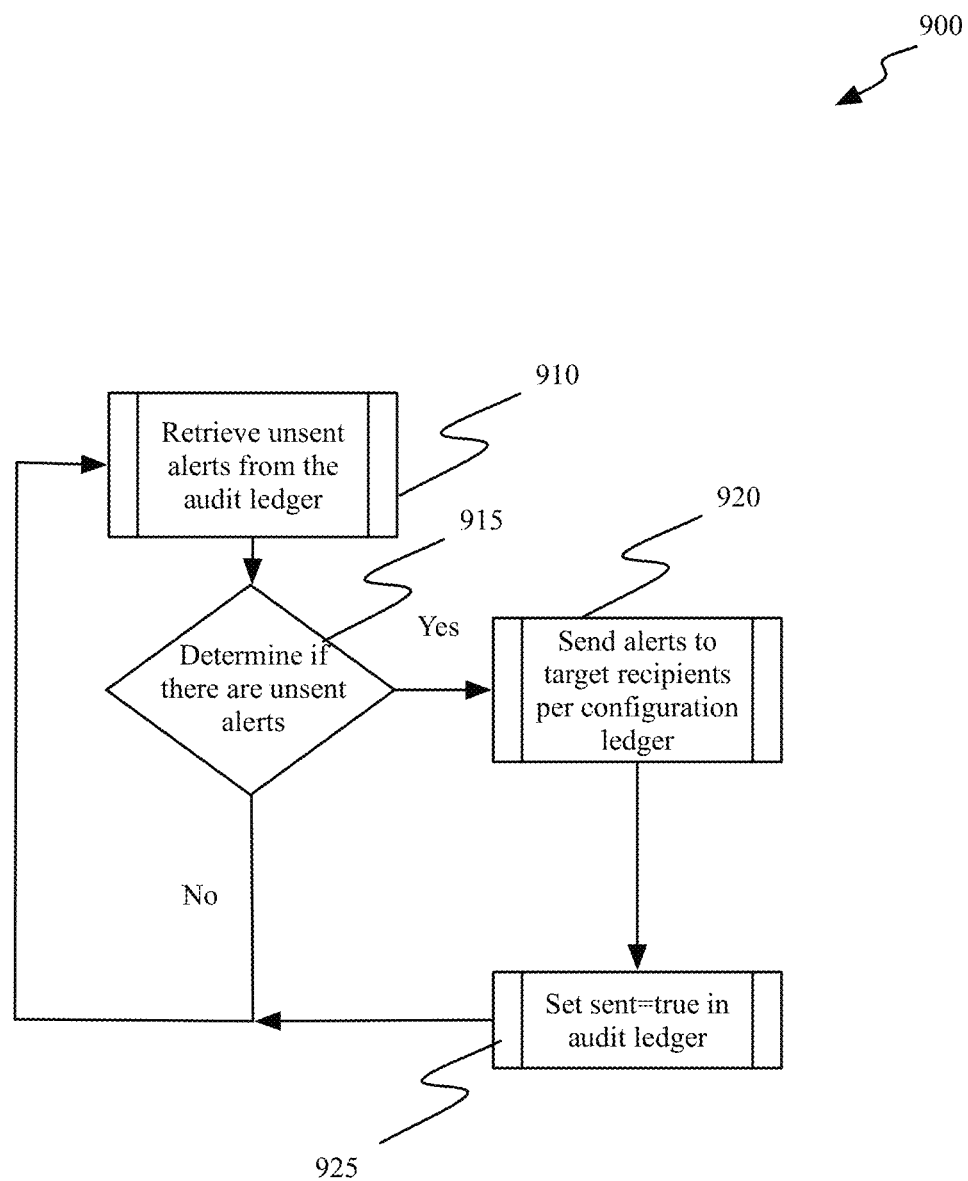
FIG. 9 is a block diagram of notification operations and activities performed by various components of the cybersecurity infection detection system.

Referring now to FIG. 9, in some embodiments, a notification engine 115 requests or receives a list of alerts stored in the audit ledger 910. If it is determined that one or more of these alerts is an unsent alert 915, then the alert is process such that the alert is sent to one or more target recipients based on one or more of a listing of target recipients in the configuration ledger 920, internal system component recipients base on alert handling instructions, or both. Once an alert is sent to the target recipients, the audit ledger is updated with an entry indicating the alert was sent 925. In some implementations, alert handling is dependent on one or more of alert priority, criticality, the role of the protected device, or other context or circumstances.

Figure 10:
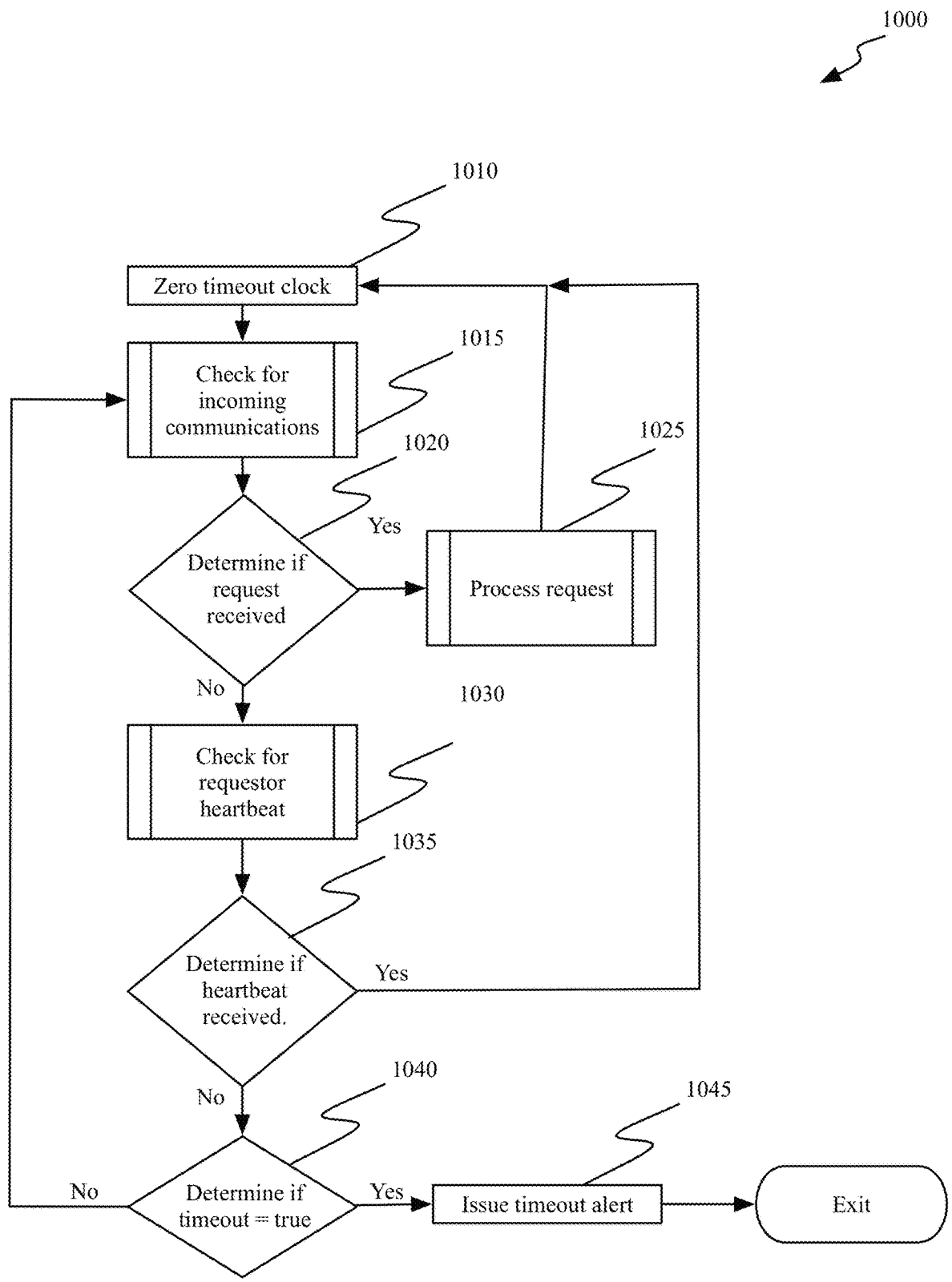
FIG. 10 is a block diagram of an exemplary receiving side component control messaging operations performed by various components of the cybersecurity infection detection system.

Referring now to FIG. 10, in some implementations, a receiving side component, maintains an operational check on a sending side component in communication with the receiving side component. In some instances, a timeout clock is zeroed out 1010 before each operational check. The receiving side component can check for communications from a sending side component 1015, and if it is determined that a requests is received 1020, process the request accordingly 1025. Alternatively, if the communication is not a request, the receiving side component can check for a heartbeat request 1030. If it is determined that a heartbeat request is received 1035, the process can repeat. Alternatively, if it is determined that a heartbeat was not received 1035, and if it is also determined that the timeout period has elapsed 1040, then a timeout alert can be issued 1045.

Figure 11:
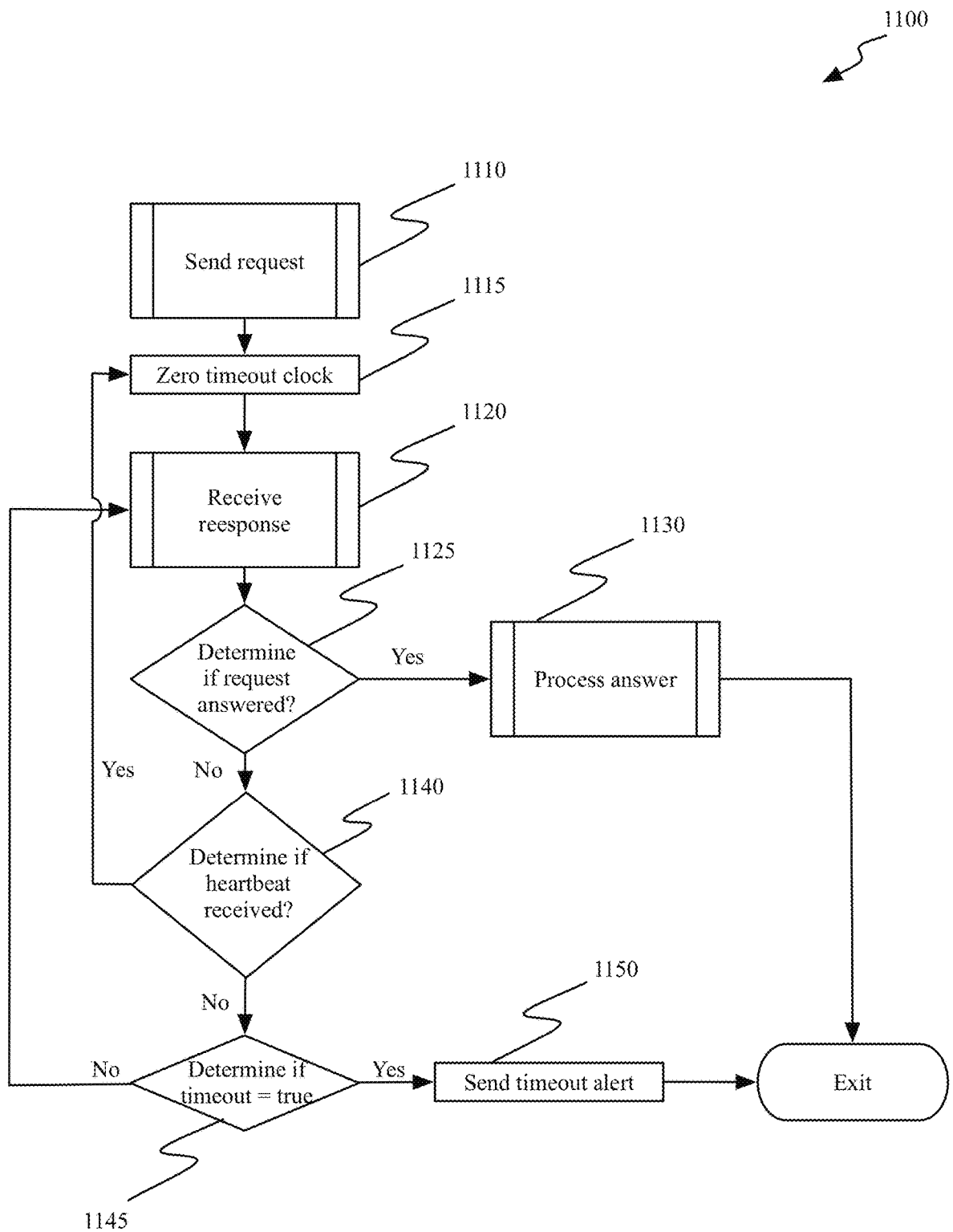
FIG. 11 is a block diagram of an exemplary sending side component control messaging operations performed by various components of the cybersecurity infection detection system.

Referring now to FIG. 11, in some implementations, a sending side component, maintains an operational check on a receiving side component in communication with the sending side component. In some instances, a request is sent to a receiving side component 1110 and a timeout clock is zeroed out 1115 before each operational check. The sending side component, upon receipt of a response from the receiving side component 1120 determines the response includes the requested answer 1125. If it does include the requested answer, then the answer can be processed accordingly 1130. Alternatively, if it does not include the requested answer, the sending side component can determine if the received response is a heartbeat 1140. If it is determined that it is a heartbeat 1140, the process can repeat. Alternatively, if it is determined that a heartbeat was not received 1140, and if it is also determined that the timeout period has elapsed 1145, then a timeout alert can be issued 1150.

In some embodiments, the ledgers are physically secure, remote, redundant, databases comprised of records that are digital signature linked into an immutable or near-immutable chain. Each ledger can be front-ended by a ledger server. Each ledger server is protected by one, or more, monitors and their associated probes.

In some embodiments, the content portion of all communications to a ledger server are encrypted with each ledger server's Public Key. Only each specific ledger server will be able to decrypt them. The ledger server's Private Key may not be stored on a disk. It is generated as needed by the ledger server, using in part, its own hash as a seed for key generation. Thus, in most cases of ledger server includes, the ledger server will not be able to generate its appropriate Private Key. In that situation, communications with the ledger server will fail their signature tests and, when the failure is logged in the audit ledger (those not front-ended by the compromised server), the ledger server will be shut down.

In some embodiments, the control consoles are one or more of physically secure, remote, redundant, computers. Each control consoles can be protected by one, or more, monitors and their associated probes.

In some embodiments, the content portion of all communications to a control consoles are encrypted with that control consoles's Public Key. Only the specific control consoles will be able to decrypt them. The control consoles's Private Key may not be stored on a disk. It is generated as needed by the control consoles, using in part, its own hash as a seed for key generation. Thus, in most cases of control consoles compromise, the control consoles will not be able to generate its appropriate Private Key. In that situation, communications with the control consoles will fail their signature tests and, as when the failure is logged in the audit ledgers, the control consoles will be shut down.

In some embodiments, a secure message protocol can be built on top of the application layer. Each Message can consist of at least two primary parts: to whom the message is intended and from whom it came, and the contents of the message.

Both parts are one or more of digitally signed by the sender and encrypted with the public of key(s) of their intended recipients(s). In some instances, when the switchboard is in use, the initial "To" is always to a switchboard, and the final leg "From" is also always from a switchboard. The content portions of the message can also have digitally signed "from" identification".

Throughout this disclosure, in certain implementations, when it states that something is "encrypted with the Public Key" of a recipient, that can mean that the encryption is performed using a one-time, randomly generated symmetric encryption key, and that this symmetric encryption is then encrypted with the Public Key(s) of the intended recipient(s). It is the encrypted symmetric key(s) that is (are) included within the message.

In the event that the content is intended for multiple recipients, the content is encrypted only once, using the symmetric encryption key. It is only the one-time symmetric encryption key that is encrypted multiple times, using the respective Public Keys of each of the intended recipients.

In some embodiments, the switchboard is one or more of a physically secure, remote, redundant components that may be used for traffic anonymization. A switchboard can be, for example, a dedicated device, as in a dedicated server or a software program running resident within another security device (e.g., a firewall). It can be protected by at least one monitor and at least one associated probe.

If a switchboard fails to one or more of initiate properly, is discovered to be "defective", (e.g., it fails a hash comparison test), or cannot find a resident Probe, that switchboard will, whenever possible, report its condition to the audit ledger and then will be shut down.

Figure 12:
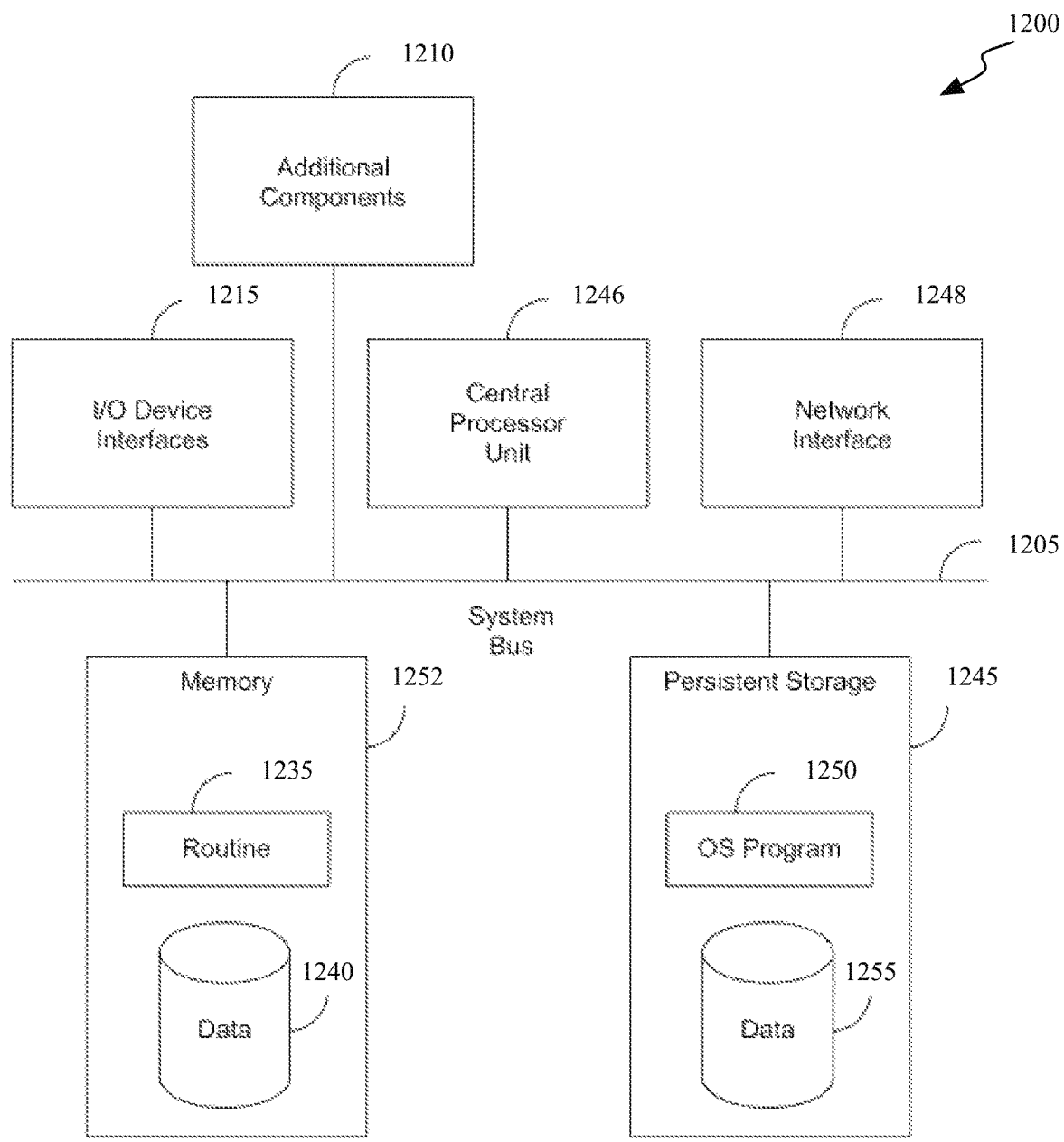
FIG. 12 is a block diagram of the internal structure of a computer used in the computer network of FIG. 1.

Referring now to FIG. 12, each component of the cybersecurity infection detection system is connected to a system bus 1205, providing a set of hardware lines used for data transfer among the components of a computer or processing system. Also connected to the bus 1205 are additional components 1210, such as additional memory storage, digital processors, network adapters, and I/O devices. The bus 1205 is essentially a shared conduit connecting different elements of a computer system (e.g., processor, disk storage, memory, input/output ports, network ports, etc.) and enabling transfer of information between the elements. An I/O device interface 1215 is attached to system bus 205 in order to connect various input and output devices (e.g., keyboard, mouse, touch-screens, displays, printers, speakers, etc.) to the extended package collaboration system. A network interface 1248 allows the computer to connect to various other devices attached to a network. A memory 1252 provides volatile storage for computer software instructions 1235 and data 1240 used to implement methods employed by the system disclosed herein. Disk or persistent storage 1245 provides non-volatile storage for computer software instructions 1250 and data 1255 used to implement an embodiment of the present disclosure. A central processor unit 1246 is also attached to system bus 1205 and provides for the execution of computer instructions.

In one embodiment, the processor routines 1235 and 1250 are a computer program product, including a computer readable medium (e.g., a removable storage medium such as one or more flash drives, DVDROM's, CD-ROM's, diskettes, tapes, etc.) that provides at least a portion of the software instructions for the system. A computer program product that combines routines 1235 and data 1240 can be installed by any suitable software installation procedure, as is well known in the art. In another embodiment, at least a portion of the software instructions can also be downloaded over a cable, communication, and/or wireless connection.

While the foregoing disclosure sets forth various embodiments using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

Furthermore, while various embodiments have been described and/or illustrated herein in the context of fully functional computing systems, the functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as can be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon." Also, the term "immediately" with respect to a delay of machine action means without delay typically perceivable by human users.

What is claimed is:

1. A cybersecurity infection detection system comprising in combination:
   (i) a computing system comprising:
      a. at least one processor;
      b. at least one computer memory; and
   (ii) a plurality of redundant components comprising:
      a. a plurality of probes operable to self-destruct upon detection of one or more of a failed initialization event or a defective state;
      b. a plurality of monitors operable to launch the one or more probes and send instruction to the one or more probes, wherein the instructions comprise taking a system element hash at a specified time;
   (iii) one or more ledgers comprising at least one from the group comprising a signature ledger, an audit ledger, and a configuration ledger;
   (iv) one or more configuration controllers;
   (v) a messaging engine operable to one or more of control messaging between the plurality of redundant components or generate a plurality of encrypted channel disruption detection messages;
   (vi) a public-private key infrastructure; and
   (vii) at least one traffic anonymizing switchboard operable to prevent traffic monitoring through one or more of header encryption operations, header decryption operations, and message rerouting operations.

* * * * *